(No Model.)

S. T. MUFFLY.
CHURN.

No. 592,812. Patented Nov. 2, 1897.

Witnesses
Marcus L. Byng.
K. A. Mau.

Inventor.
Sidney T. Muffly.
by John Wedderburn
Attorney

UNITED STATES PATENT OFFICE.

SIDNEY T. MUFFLY, OF ROANOKE, VIRGINIA.

CHURN.

SPECIFICATION forming part of Letters Patent No. 592,812, dated November 2, 1897.

Application filed June 27, 1896. Serial No. 597,200. (No model.)

*To all whom it may concern:*

Be it known that I, SIDNEY T. MUFFLY, a citizen of the United States, residing at Roanoke, in the county of Roanoke and State of Virginia, have invented certain new and useful Improvements in Churns; and I do hereby declare the following to be a full, clear, and exact description of the invention, such as will enable others skilled in the art to which it appertains to make and use the same.

This invention relates to churns of the rotary double-dasher type.

My object is to more effectually set the milk in agitation and to bring about a more perfect coalescence of its constituents into butter. These objects I accomplish by the employment of certain peculiar features and novel combinations, as will appear more fully from the following specification and the accompanying drawings, in which—

Figure 1:
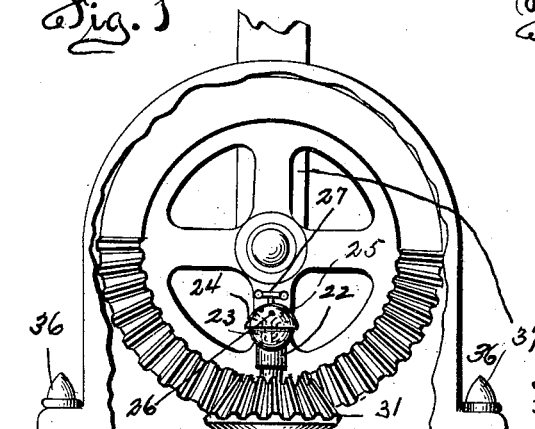
Figure 2:
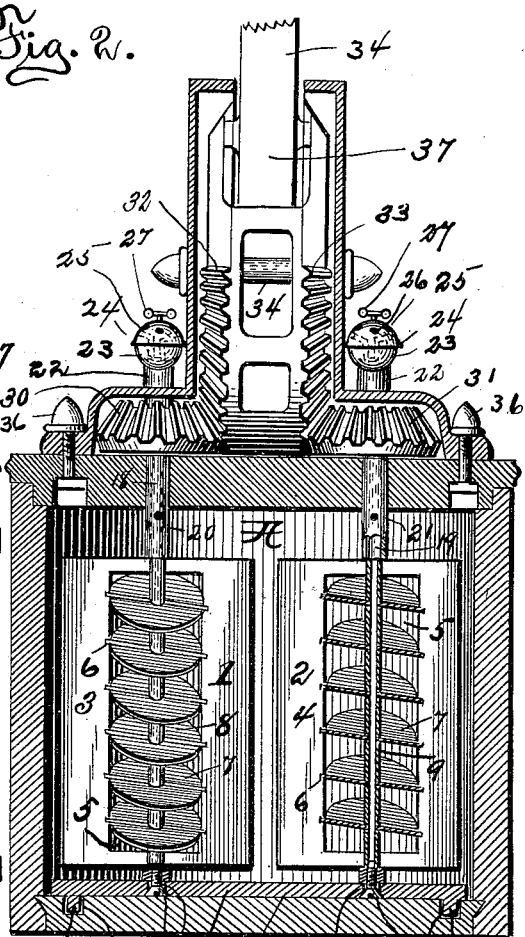
Figure 3:
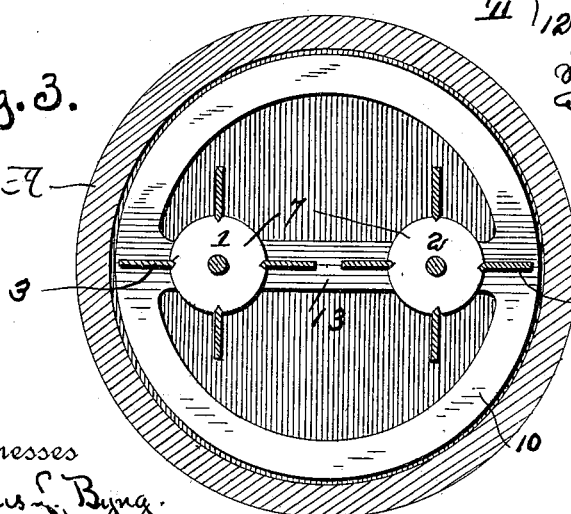
Figure 4:
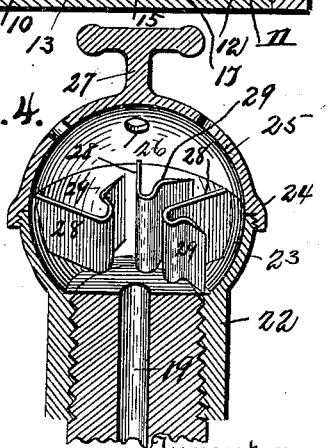

Figure 1 is a side elevation with the gearing-casing broken away; Fig. 2, an end elevation with a portion of the churn-body removed to disclose the dashers and the gearing-casing shown in section; Fig. 3, a sectional top view taken below the churn-cover, and Fig. 4 a detail view of the ventilating-cup carried on the upper end of each dasher-shaft.

The churn-body A is circular, consisting of a suitable bottom and sides and a removable cover.

The twin dashers 1 and 2 consist of sets of radial rectangular blades 3 and 4, which are provided with longitudinal openings 5. The inner edges of the blades are provided with a series of alternately-disposed notches 6. Parallel obliquely-disposed disks 7 have their edges held in said notches.

The respective dashers are carried on vertically-disposed shafts 8 and 9.

The numeral 10 designates a circular frame, which is provided with lugs 11, adapted to enter notches 12 in the bottom of the churn-body, and has a cross-bar 13. The cross-bar is provided with apertures 14 and 15, which receive the conical heads of screws 16 and 17, which have screw-threaded shanks that enter the lower ends of the vertical shafts.

The shafts 8 and 9 are journaled in the churn-cover, and the said shafts are provided with central longitudinally-extending air-passages 18 and 19. Sets of branch passages 20 and 21 lead from the central passages into the upper portion of the churn-body. The upper extremities of the shafts are screw-threaded for engagement with the screw-threaded coupling 22 of the lower section 23 of a hollow spherical air-inlet head. The upper portion of the lower section 23 is provided with an annular screw-threaded lip 24, adapted for engagement with suitable screw-threads on an upper section 25. This upper section is provided with a series of perforations 26 and a handle 27. The air-inlet head is provided with a series of fan-blades consisting of radial portions 28 and curved bent portions 29, all of which is clearly shown in Fig. 4. The vertical shafts carry bevel-pinions 30 and 31.

The numerals 32 and 33 represent mutilated bevel-gears, which are secured to a shaft 34, that is journaled in a casing or housing which incloses the gearing, being fastened to the churn-cover by bolts 36.

The numeral 37 designates a rockable lever which is connected to shaft 34 and is the means whereby the churn is operated.

The operation is as follows: When the lever 37 is rocked back and forth, rotary reciprocating motion is imparted to the dashers, which revolve in opposite directions. This movement sets up oppositely-swirling currents in the milk, which are broken up, and counter-currents generated when the dashers rotate back again. The disposition of the blades and disks causes the milk to alternately flow down from the center of one dasher and up the other, resulting in a most perfect agitation of the milk and cream. As the dashers reciprocate pure air is drawn into the churn through one shaft and the gases evolved are expelled through the other shaft. This circulation of the air is caused because the dasher-shafts rotate in opposite directions when the lever is rocked one way. When the dashers rotate in the opposite direction, the action is reversed.

Having thus described my invention, what I claim as new is—

1. In a churn, the combination with a churn body or receptacle, of a dasher comprising radial blades and obliquely-disposed disks both of which are connected to a rotary shaft, and means for driving said shaft, substantially as described.

2. In a churn, the combination with a churn body or receptacle, of twin dashers each comprising radial blades and obliquely-disposed disks both of which are connected to a rotary shaft, said dashers being adapted to revolve in opposite directions, and means for rotating the dashers, substantially as described.

3. In a churn, the combination with a churn body or receptacle, of rotary dashers each comprising radial blades and obliquely-disposed disks, the disks of each dasher slanting in the same direction, and means for rotating said dashers in opposite directions.

4. In a churn, the combination with a churn body or receptacle, of dashers each comprising radial blades and obliquely-disposed disks, and means for imparting opposite rotary reciprocating motion to said dashers, substantially as described.

5. In a churn, the combination with a churn body or receptacle, of rotary shafts provided with air-inlet openings communicating with the interior of the churn, and dashers carried by said shafts, of fan-blades carried by the respective shafts, being adapted for drawing air in through one shaft and expelling the gases evolved during the churning process out through the other shaft, when said shafts are rotated, substantially as described.

6. The herein-described churn-dasher, comprising a shaft, a plurality of inclined separated disks secured thereto, and a flat blade provided with an opening in its center which receives the disks and which blade extends in substantially diametric relation to the same.

In testimony whereof I have signed this specification in the presence of two subscribing witnesses.

SIDNEY T. MUFFLY.

Witnesses:
LAWRENCE S. DAVIS,
J. T. STRICKLAND.